Patented Aug. 19, 1947

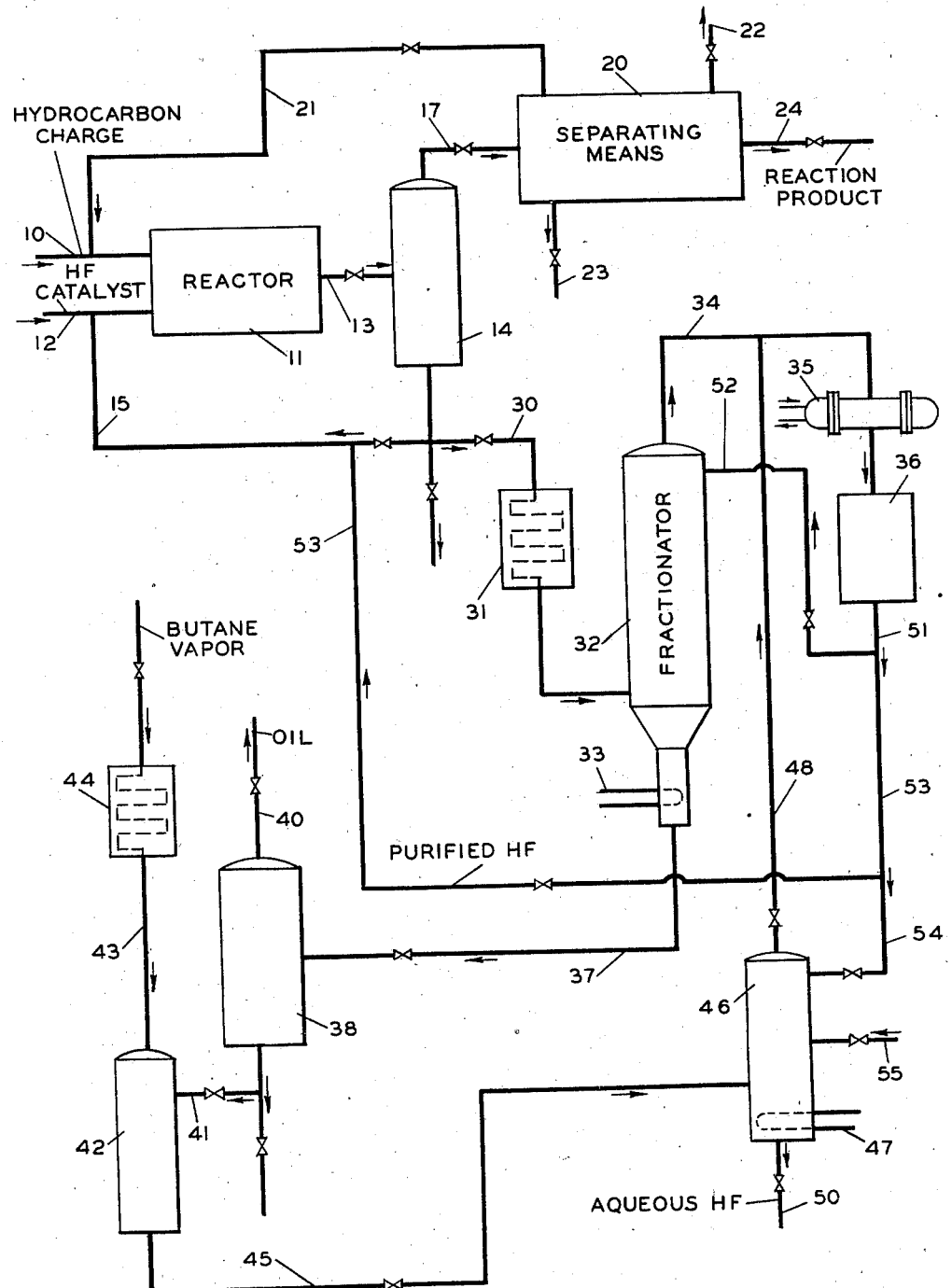

2,425,752

UNITED STATES PATENT OFFICE 2,425,752

SEPARATION OF HYDROGEN FLUORIDE FROM WATER AND ORGANIC CONTAMINANTS BY DISTILLATION AND DECANTATION

George E. McKenna and George R. Hettick, Phillips, Tex., assignors to Phillips Petroleum Company, a corporation of Delaware Application September 15, 1944, Serial No. 554,307

5 Claims. (Cl. 202—40)

This invention relates to the purification of catalysts employed in the conversions of organic compounds. In a particular embodiment this invention relates to the recovery of hydrofluoric acid in a more or less purified form from a used hydrofluoric acid catalyst.

Concentrated hydrofluoric acid has become of considerable commercial importance as a catalyst in organic conversion processes. Considerable work has been done to develop its use as a catalyst for the alkylation of aliphatic and aromatic organic compounds, with particular emphasis upon the production of hydrocarbons boiling in the motor fuel range by the reaction of low-boiling paraffinic and aromatic hydrocarbons with low-boiling olefins. Hydrofluoric acid can also be used as a catalyst in effecting ring-closure, as a catalyst and as a selective solvent for the removal of non-hydrocarbon impurities present in hydrocarbon materials, as a catalyst for the isomerization of hydrocarbons, as a catalyst for the conversions of hydrocarbons into other organic compounds such as alcohols, ethers, acids, ketones, mercaptans, and the like. In many instances the hydrofluoric acid comprises about 10 to 90 per cent by volume of the total reacting mixture and is usually employed as a liquid, intimately admixed with the reactants. It may be substantially anhydrous or may be employed associated with small amounts of water. Various materials may be used in small amounts in conjunction with the hydrofluoric acid catalyst to promote its activity, such as solid adsorbent agents, boron trifluoride, and the like. Numerous investigators have emphasized the fact that the use of hydrofluoric acid as a catalyst in such reactions is not accompanied by extensive side reactions such as have been found to be obstacles in connection with the use of catalysts such as concentrated sulfuric acid. However, we have found that in commercial processes small amounts of organic impurities are produced by side reactions and tend to accumulate in the liquid hydrofluoric acid. Also we have found that water tends to accumulate in the liquid hydrofluoric acid since this material is a very strong dehydrating agent and it is almost impossible to effect a complete drying of the materials entering a large commercial plant. We have also found that the water which is present makes very difficult the removal of organic impurities and also that the organic impurities which are present makes it difficult to remove the water which accumulates in the catalyst. We have further found that satisfactory purification of used hydrofluoric acid can be obtained when a portion of this used acid is distilled under conditions such that a large portion of the organic impurities and of the water and a substantial portion of the hydrogen fluoride remain unvaporized, separating as liquid organic impurities from the residue, vaporizing a portion of the remaining hydrogen fluoride and combining this vaporized portion with the low-boiling hydrogen fluoride fraction recovered from the first mentioned distillation.

One of the objects of this invention is to recover hydrogen fluoride from fluid mixtures containing the same.

Another object of this invention is to separate hydrogen fluoride from accompanying organic contaminants and from water.

Still another object of this invention is to purify a hydrogen fluoride catalyst.

Further objects and advantages of our invention will become apparent, to one skilled in the art, from the accompanying disclosure and discussion.

Our invention can be more readily described by reference to the accompanying drawing which forms a part of this application and which shows diagrammatically by means of a flow sheet an arrangement of apparatus in which a preferred form of our invention may be practiced.

A suitable hydrocarbon charge is passed through pipe 10 to reactor 11 and a hydrogen fluoride catalyst is passed through pipe 12 to reactor 11. As previously discussed the invention can be applied to the effluents of any one of a number of processes. Generally, however, the invention will be applied to paraffinic hydrocarbon effluents of an alkylation process or of an isomerization process. When the process is one of alkylation the hydrocarbon charge will comprise a mixture of paraffins and olefins and the reaction conditions maintained in the reactor will be those well known to the art. When the process is one for isomerization of paraffin hydrocarbons the hydrocarbon charge will comprise paraffins to be isomerized and the reaction conditions will be somewhat similar to those known for alkylation so far as temperature, pressure and contact time are concerned. In either event hydrogen fluoride may be the essential catalyst and, if desired, may be promoted by weight of boron trifluoride. Effluents of the reactor 11 are passed through pipe 13 to separator 14 wherein the separation is effected between hydrocarbon effluents and hydrofluoric acid. The hydrofluoric acid is removed through pipe 15 and may be returned at least in part to the reactor 11.

The hydrocarbon material, generally in liquid phase and containing a minor amount of dissolved hydrogen fluoride, is passed from separator 14 through pipe 17 to separating means 20 wherein various product fractions, recycle fractions, and the like are recovered. A suitable recycle fraction may be returned to reactor 11 through pipe 21. Low-boiling undesired products may be discharged through pipe 22 and high-boiling undesired products may be discharged through pipe 23. A desired product fraction, such as a suitable alkylate fraction, may be recovered through pipe 24.

A portion of the used hydrofluoric acid is passed through pipe 30 and heater 31 to a fractionator 32, which may be operated under a pressure between about atmospheric and about 100 pounds per square inch gage and at a temperature between about 250 and 350° F. Satisfactory operation is obtained with a fractionator which has a large cross section at the top and a small cross section at the bottom containing suitable packing or bubble trays, not shown, with introduction of the feed at a point approximately at the juncture between the large and the small cross sections. Heat may be supplied to the bottom of the fractionator by means of a suitable heating means illustrated by coil 33. This fractionator is so operated as to pass a major portion of the hydrogen fluoride contained in the charge as an overhead substantially anhydrous product through pipe 34 and cooler and condenser 35 to an accumulator 36. Most of the water and high-boiling organic impurities present in the used catalyst, together with an amount of hydrogen fluoride appreciably in excess of that which will form a maximum-boiling azeotropic mixture with the water, are removed as a liquid mixture from the bottom of fractionator 32 through pipe 37 to a settling tank 38. Settling tank 38 is preferably of such a size that the liquid mixture can be retained in it for a substantial period of time, such as from about 2 to about 12 hours. Preferably the tank is insulated so as to maintain a temperature between about 250 and 300° F. during this time. The mixture separates into a lighter liquid oil fraction and a heavier aqueous hydrofluoric acid fraction. Apparently the amount of hydrogen fluoride present in this aqueous layer tends to increase somewhat during this residence period over that which is found in the aqueous portion of the mixture passing through pipe 37. The oil can be removed and discharged from the process through pipe 40 and the aqueous hydrofluoric acid is passed to a second distillation step, which may be a simple flash distillation conducted in vaporization zone 46. Since this material is quite corrosive it is difficult to handle by an ordinary liquid pump and may be conveniently passed to vaporization zone 46 by partially filling tank 42 through pipe 41 with the aqueous liquid, introducing vapor of a low-boiling paraffinic hydrocarbon, such as propane or a butane, to tank 42 through pipe 43 and heater 44, and forcing the aqueous liquid by the pressure of this vapor through pipe 45 to vaporization zone 46. Vaporization zone 46 may be a simple flash drum wherein vapors are removed from the aqueous liquid in a simple flash distillation, without packing or bubble trays. Heat is supplied to such a zone by means of a suitable heating coil 47. Vapors so formed are passed through pipe 48 and mixed with the vapors from fractionator 32 passing through pipe 34. Aqueous hydrofluoric acid containing only slightly more hydrogen fluoride than would normally be contained in a maximum-boiling azeotropic mixture is discharged from the process through pipe 50. From accumulator 36 liquid concentrated, and purified, hydrofluoric acid is removed through a pipe 51. A portion of this stream is returned as a reflux liquid to the top of fractionator 32 through pipe 52. A further portion of this liquid is passed through pipe 53 to pipe 15 and reactor 11 for further use as a catalyst in the process.

In some instances it may be desirable to effect a more complete fractionation of the aqueous hydrofluoric acid in vaporizer 46. In such a case vaporizer 46 may be supplied with conventional packing or bubble trays and may be cooled by a liquid reflux stream passed from pipes 51 and 53 through pipe 54, thereby being operated as a conventional fractional distillation column. Removal of water from the vaporous hydrogen fluoride may be aided by introduction of a third material through pipe 55. However, in many instances the use of either or both of these expedients involves considerable expense since the material treated in vaporizer 46 is quite corrosive and the more complicated apparatus, which is necessary for such modifications, is comparatively quite expensive as compared with the simple apparatus first discussed. For these reasons it will generally not be found that the additional expense is justified over the minor expense necessary for the satisfactory operation which can be obtained with the less complicated equipment.

It will be readily appreciated by those skilled in the art that the drawing illustrates the use of conventional equipment which is not shown in detail, and that much conventional equipment such as heaters, coolers, condensers, reflux equipment, pumps, compressors, catalyst chambers, and the like, will be necessary in the practice of any specific embodiment of our invention and can readily be adapted by one skilled in the art in the light of the teachings and discussion presented herein.

As an example of the operation of our process a used hydrofluoric acid catalyst, from a process for the alkylation of isobutane by reaction with butylenes, having a composition and in an amount shown in the accompanying table is passed through pipe 30 to fractionator 32, which is operated under a pressure of 20 pounds gage with a top temperature of about 170° F. and a kettle temperature of about 290° F. A mixture of acid-soluble oil and aqueous hydrofluoric acid is passed through pipe 37 to settling tank 38 and allowed to stand at a temperature of about 275° F. for a period of about 4 hours. The oil which is removed from the aqueous hydrofluoric acid is discharged from the system through pipe 40 in an amount shown in the table. The aqueous hydrofluoric acid is passed to a simple flash drum 46 operated at a temperature of about 280° F. and a pressure of about 20 pounds gage. A small amount of aqueous hydrofluoric acid is discarded through pipe 50, and purified hydrofluoric acid catalyst is recovered from accumulator 36 and returned through pipes 53 and 15 to the reactor. Although the amounts of oil and of water removed by this operation are apparently relatively small they are sufficiently large to maintain the purity of the catalyst at a desired level for satisfactory commercial operation of the alkylation process.

|  | Used HF Catalyst Charge to Fractionator 32 | Acid Soluble Oil Removed through Pipe 40 | Aqueous HF to Flash Drum 46 through Pipe 45 | Aqueous HF Removed through Pipe 50 | Purified HF Returned through Pipe 53 |
|---|---|---|---|---|---|
| Volume, B/D | 960 | 23 | 19 | 15 | 922 |
| Composition, wt. per cent: |  |  |  |  |  |
| HF | 89.70 | 0.19 | 19.70 | 2.58 | 91.80 |
| H₂O | 0.52 | | 3.22 | 3.75 | 0.48 |
| Acid Soluble Oils | 3.40 | 99.81 | 77.08 | 93.67 | 1.36 |
| Light Hydrocarbons | 6.38 | | | | 6.36 |
|  | 100.00 | 100.00 | 100.00 | 100.00 | 100.00 |

It will be readily appreciated that various modifications, and embodiments of our invention may be practiced, by one skilled in the art, by following the teachings of the present disclosure without departing from the spirit thereof or from the scope of the claims.

We claim:

1. In a process for the conversion of hydrocarbons in the presence of a hydrofluoric acid catalyst, the improved process of recovering purified hydrogen fluoride from the used catalyst which comprises passing at least a portion of a used hydrofluoric acid catalyst from such a conversion process to a first distillation to recover substantially anhydrous hydrogen fluoride as an overhead product, cooling and condensing said overhead product, recovering as a high-boiling product of said first distillation an aqueous hydrofluoric acid containing hydrogen fluoride in an amount in excess of that found in an aqueous azeotropic mixture together with organic impurities, passing said high-boiling product to a separator, separating said organic impurities from said aqueous hydrofluoric acid, subjecting said aqueous hydrofluoric acid to a second fractional distillation to recover substantially anhydrous hydrogen fluoride as an overhead product, combining this last said overhead product with said overhead product from the first said distillation prior to said condensation, returning a portion of the resulting condensate to said first distillation as reflux, and recovering a further portion of said condensate as purified hydrogen fluoride.

2. An improved process for recovering purified hydrogen fluoride from a used hydrogen fluoride catalyst containing water and high-boiling organic compounds as contaminants, which comprises passing such a used hydrofluoride acid catalyst as a liquid to a distillation zone, recovering from said distillation zone a low-boiling fraction comprising purified hydrogen fluoride and a high-boiling fraction comprising water, organic compounds and hydrogen fluoride in an amount in excess of that which forms an aqueous azeotropic mixture, separating said organic compounds from said high-boiling fraction, subjecting a residual aqueous hydrofluoric acid to a flash distillation to decrease the hydrogen fluoride content thereof, discharging the unvaporized residue from said flashing, admixing vapors from said flashing with the aforesaid low-boiling fraction and cooling and condensing the resulting mixture, passing a portion of said condensed mixture to said distillation zone as a reflux liquid, and recovering a further portion of said condensed mixture as a purified hydrogen fluoride product.

3. An improved process for recovering purified hydrogen fluoride from a hydrogen fluoride catalyst which has become contaminated with water and organic impurities during use in an organic conversion process, which comprises subjecting such a used hydrofluoric acid catalyst to a fractional distillation, recovering from said distillation a low-boiling fraction comprising purified hydrogen fluoride and a high-boiling fraction comprising water, organic compounds and hydrogen fluoride in an amount in excess of that which forms an aqueous azeotropic mixture with said water, passing said high-boiling fraction to a separating zone and maintaining same therein at a temperature between about 250 and about 300° F. for a period of time between about 2 and about 12 hours to effect a separation between liquid organic material and liquid aqueous hydrofluoric acid, subjecting said aqueous hydrofluoric acid to a flash distillation at a temperature between about 250 to about 300° F. to decrease the hydrogen fluoride content thereof, admixing resulting hydrogen fluoride vapors with the aforesaid low-boiling fraction, cooling and condensing the resulting admixture, passing a portion of said condensed mixture to said distillation, and recovering a further portion of said condensed mixture as a purified hydrogen fluoride product.

4. An improved process for recovering purified hydrogen fluoride from a hydrogen fluoride catalyst which has become contaminated with water and organic impurities during use in an organic conversion process, which comprises subjecting such a used hydrogen fluoride catalyst to a fractional distillation, recovering from said distillation a low-boiling fraction comprising purified hydrogen fluoride and a high-boiling fraction comprising water, organic compounds and hydrogen fluoride in an amount in excess of that which forms an aqueous azeotropic mixture with said water, passing said high-boiling fraction to a separating zone and maintaining same therein at a temperature between about 250 and about 300° F. for a period of time between about 2 and about 12 hours to effect a separation between liquid organic material and liquid aqueous hydrogen fluoride, subjecting said aqueous hydrogen fluoride to a second fractional distillation at a temperature between about 250 and about 300° F., and recovering from said second fractional distillation a low-boiling fraction comprising purified hydrogen fluoride as a product of the process and a high-boiling fraction comprising water and hydrogen fluoride in approximately the azeotropic composition.

5. In a process for the conversion of hydrocarbons in the presence of a hydrofluoric acid catalyst, the improved process of recovering purified hydrogen fluoride from a used catalyst which comprises passing at least a portion of a used hydrofluoric acid catalyst from such a conversion process to a first distillation to recover substantially anhydrous hydrogen fluoride as an overhead product, recovering as a high-boiling product from said first distillation an aqueous hydrofluoric acid containing hydrogen fluoride in an amount in excess of that found in an aqueous azeotropic mixture together with organic impurities, passing said high-boiling product to a separation zone, separating said organic impurities from said aqueous hydrofluoric acid in said separation zone, passing said hydrofluoric acid to a second fractional distillation to recover substantially anhydrous hydrogen fluoride as an overhead product, combining said overhead products from said fraction distillations and recycling the resulting mixture comprising anhydrous hydrogen fluoride to said hydrocarbon conversion process.

GEORGE E. McKENNA.
GEORGE R. HETTICK.

REFERENCES CITED

The following references are of record in the file of this patent:

UNITED STATES PATENTS

| Number | Name | Date |
|---|---|---|
| 2,342,677 | Linn | Feb. 29, 1944 |
| 2,018,397 | Calcott | Oct. 22, 1935 |
| 2,376,051 | Hackmuth | May 15, 1945 |
| 2,368,497 | Shipley | Jan. 30, 1945 |

FOREIGN PATENTS

| Number | Country | Date |
|---|---|---|
| 117,359 | Australia | Aug. 5, 1942 |

Certificate of Correction

Patent No. 2,425,752. August 19, 1947.

GEORGE E. McKENNA ET AL.

It is hereby certified that error appears in the printed specification of the above numbered patent requiring correction as follows: Column 5, line 53, claim 2, for "hydrofluoride" read *hydrofluoric*; and that the said Letters Patent should be read with this correction therein that the same may conform to the record of the case in the Patent Office.

Signed and sealed this 16th day of December, A. D. 1947.

[SEAL]

THOMAS F. MURPHY,
*Assistant Commissioner of Patents.*